United States Patent Office 3,209,942
Patented Oct. 5, 1965

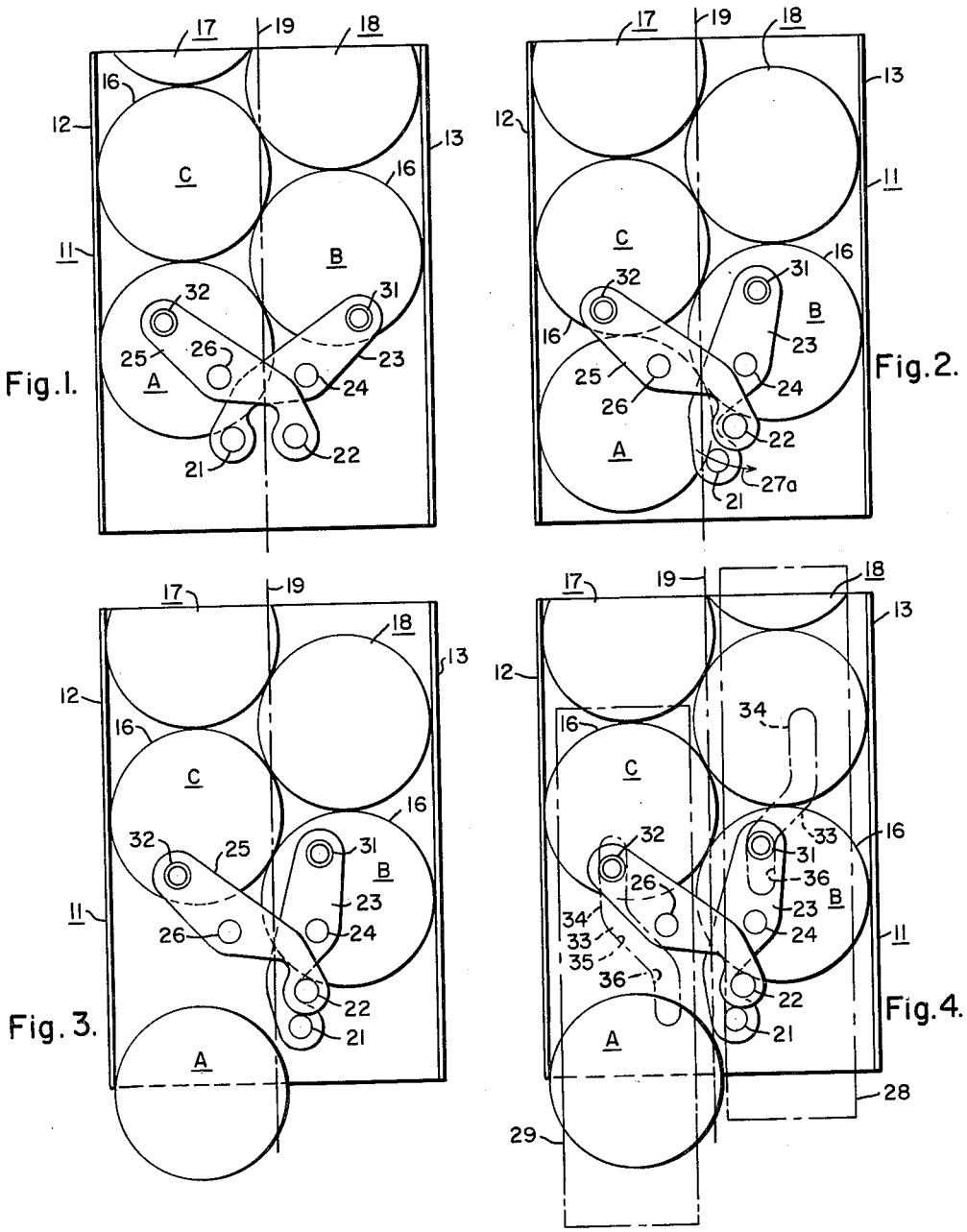

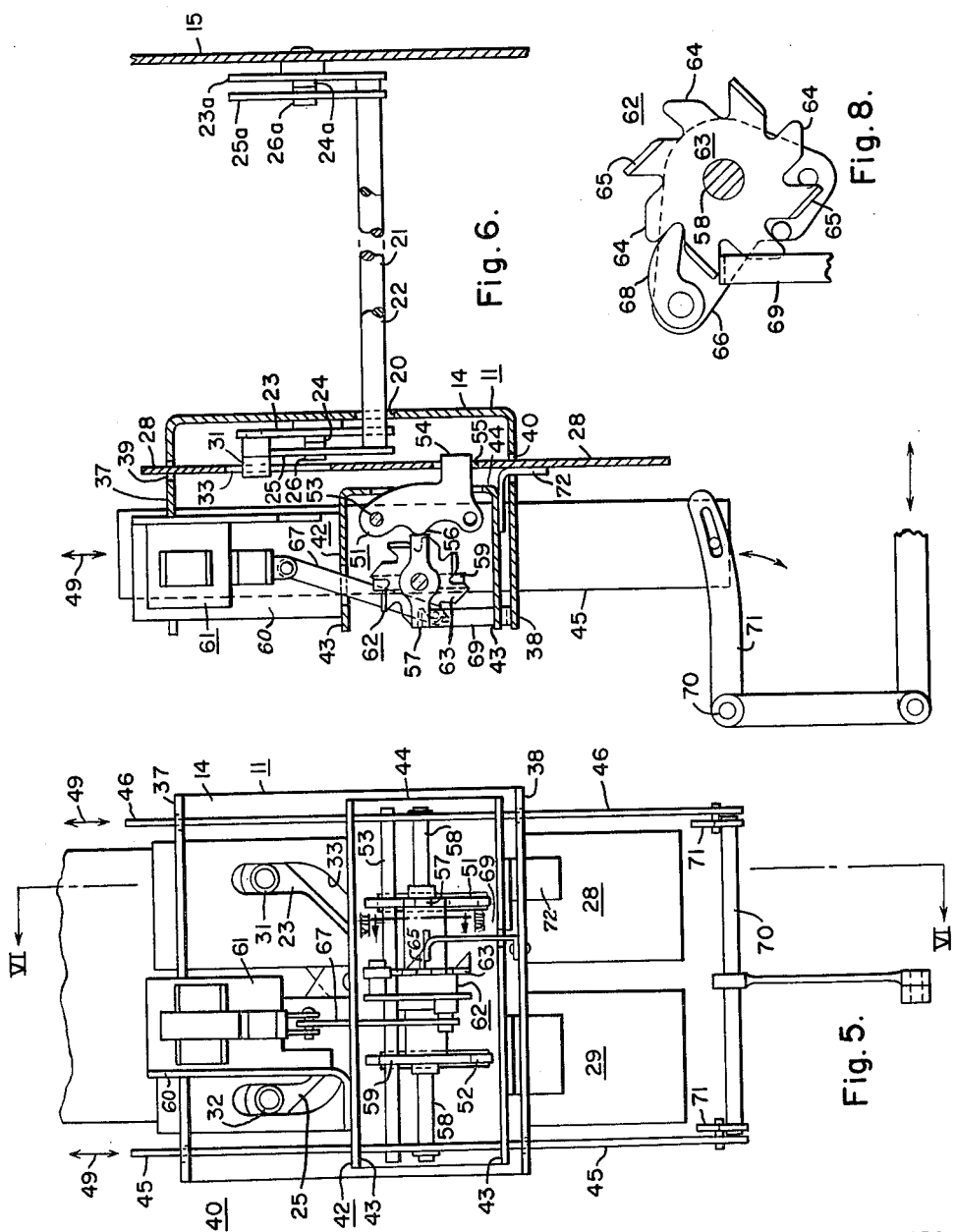

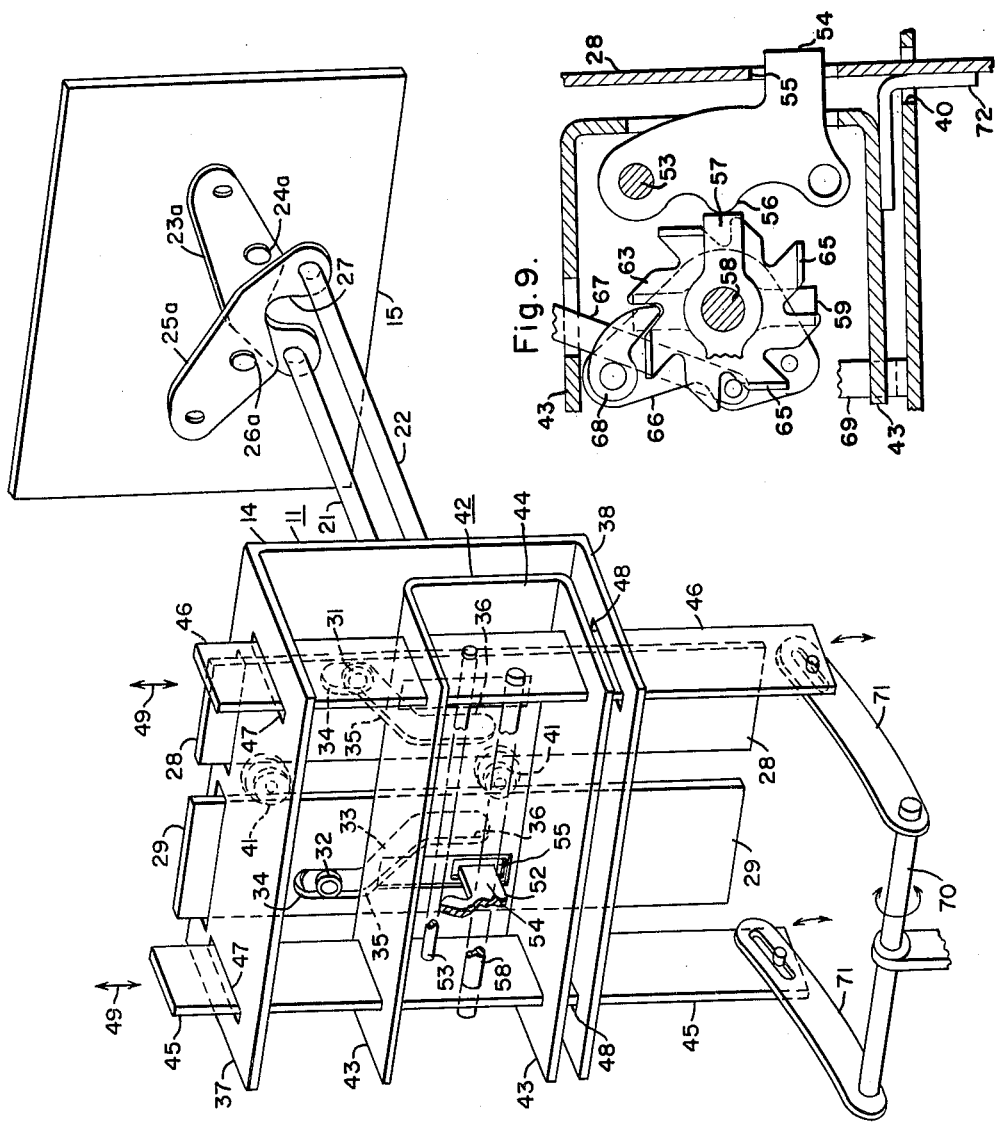

3,209,942
ARTICLE DISPENSING MECHANISM
Francis A. Gasparini, Springfield, and James E. Howard, Jr., Feeding Hills, Mass., assignors to Westinghouse Electric Corporation, East Pittsburgh, Pa., a corporation of Pennsylvania
Filed Feb. 14, 1962, Ser. No. 173,222
4 Claims. (Cl. 221—67)

This invention relates to dispensing apparatus for elongated articles of circular cross-section, such as bottles, cans and the like, in which the articles are maintained in two vertically staggered, overlapping columns, such two columns also being known as a corded stack, and it has for a primarily object to provide an improved mechanism for alternately dispensing the lowermost article from one and then the other of the columns.

A further object is to provide a dispensing mechanism of the above type having two article support members, one for each column, arranged to operate without interference with each other.

A more specific object of the invention is to provide an improvement in the dispensing mechanism of the type disclosed and claimed in Meigs W. Newberry application Serial No. 257,618, filed February 11, 1963, and assigned to the same assignee as this invention.

In the dispensing mechanism of Newberry, two article support members are disposed in the lower portion of a magazine, one under each column of vertically staggered articles disposed in overlapping or corded relation. Due to the staggered or corded relation, the support member on which the lowermost bottle rests is effective to support all the articles in the two columns. During a dispensing operation, the support member on which the lowermost bottle rests is movable in a generally horizontal path toward the other support member, thereby releasing the lowermost article and permitting the articles in the two columns to move downwardly until the lowermost article in the other column is arrested by the other support member. The one support member is then returned to its original or rest position. During the next dispensing operation, the other support member is operated in a similar manner, that is, it is first moved toward the first support member, thereby releasing the lowermost article and permitting both columns to move downwardly until further motion is arrested by the first support member, and it is then returned to its original or rest position.

In the Newberry dispensing mechanism, the two article support members are arranged for pivotal movement at equal radii about a common axis disposed above the support members. During a dispensing operation, to release the lowermost article, the support member on which it rests is moved in a generally horizontal direction toward the other support member, but its movement is limited by abutment with the said other support member.

In accordance with the present invention, each article support member is supported by a lever arm for arcuate movement about an axis disposed above the support member and on the opposite side of the central plane of the magazine. The lever arms are thus arranged in the form of an X. To effect a dispensing operation, the support member engaging the lowermost article moves in an arcuate path downwardly and across the mentioned central plane of the magazine to a position below the other article support member, thereby releasing the lowermost article and permitting the two columns of articles to descend until the lowermost article in the other column engages the other article support member, whereupon the one support member returns to its normal or rest position. By moving the article support member under, instead of alongside, the other article support member, adequate movement of the support member to release the article can readily be obtained without danger of interference with the other article support member.

The above and other objects are effected by the invention as will be apparent from the following description taken in connection with the accompanying drawings, forming a part of this application, in which:

FIG. 1 is a diagrammatic view of an article dispensing mechanism incorporating the invention, the mechanism being shown in the nondispensing or "at rest" position;

FIG. 2 is a view similar to FIG. 1, but illustrating the dispensing mechanism in an intermediate position;

FIG. 3 is a view similar to FIG. 1, but illustrating the mechanism in a dispensing position;

FIG. 4 is a view similar to FIG. 3, with the dispensing mechanism in dispensing position, but further illustrating in dot-and-dash lines simple cam structure for actuating the dispensing mechanism;

FIG. 5 is a front view of dispensing apparatus incorporating the dispensing mechanism illustrated in FIG. 4, but further illustrating mechanism for alternately operating support members of the dispensing mechanism;

FIG. 6 is a vertical sectional view taken on line VI—VI of FIG. 5, but showing the ratchet mechanism advanced to an operative position from the position shown in FIG. 5;

FIG. 7 is an isometric view of the dispensing apparatus shown in FIGS. 5 and 6 with some parts omitted for clarity;

FIG. 8 is an elevational view of the ratchet wheel and pawl, as seen from the line VIII—VIII of FIG. 5; and FIG. 9 is a sectional view similar to FIG. 6, showing the ratchet wheel and pawl on an enlarged scale.

Referring to the drawings in detail, there is shown an article retaining magazine 11 having a pair of vertically extending side walls 12 and 13 (shown in FIGS. 1 to 4) and front and rear walls 14 and 15 (shown in FIGS. 6 and 7), and adapted to retain a plurality of elongated articles of circular cross-section, such as bottles 16, cans or the like. The side walls 12 and 13 are horizontally spaced from each other to a slightly lesser degree than twice the diameter of the articles, so that the articles are retained in two vertically staggered or overlapping columns 17 and 18, or a corded stack, as illustrated and as well known in the art.

Referring especially to FIG. 1, it will be noted that the lowermost article or bottle in the columns, bottle A, is disposed in column 17, and the next-to-lowermost article or bottle B is disposed in column 18, with bottle C disposed in column 17 directly above the lowermost bottle A. In this arrangement, the central plane 19, that is, the plane parallel to and midway of the walls 12 and 13, intersects, or passes through, the bottles in both columns 17 and 18, at least in the lower portion of the magazine.

In accordance with the present invention, there is provided a support member 21 disposed in the lower portion of the magazine beneath column 17 for restraining downward movement of the two columns by abutment with the lower surface of bottle A, and there is further provided a support member 22 disposed beneath column 18. The support members are in the form of rods extending from front to rear as shown in FIGS. 6 and 7. They extend through a suitable opening 20 in the front wall 14.

In FIG. 1, the two support members or rods 21 and 22 are illustrated in the "at rest" positions and are disposed on opposite sides of the central plane 19 and preferably equidistantly therefrom horizontally. When the lowermost bottle rests thereon as shown in FIG. 1, the support member 21 is effective to support both columns 17 and 18, the bottles in column 18 being supported by engagement with bottles in column 17, while the support member 22 is ineffective to support the columns.

The support rod 21 is pivotally supported from the front and rear walls 14 and 15 by levers 23 and 23a, respectively, for arcuate movement about pivots 24 and 24a disposed on a common horizontal axis, while the support member 22 is pivotally supported from said front and rear walls by levers 25 and 25a, respectively, for arcuate movement about pivots 26 and 26a, respectively, disposed on a common horizontal axis. The pivots 24 and 24a are disposed on the opposite side of the central plane from the pivots 26 and 26a, preferably equidistantly therefrom, and also preferably in a common horizontal plane.

It will be noted that each of the mentioned levers 23, 23a, 25 and 25a includes a lower lever arm which extends obliquely downwardly and across the central plane 19, and that the support rods are secured to the lower ends of the lower lever arms. Thus, each support rod is disposed below, or substantially beneath, the pivot of the other support rod. Hence, when the two support rods 21 and 22 are in the normal or "at rest" positions shown in FIG. 1, the lower lever arms are disposed in a crossed position and form an X. Each of the levers 23 and 25 at the front also has a lever arm extending obliquely upwardly and away from the central plane, whereby the lever may be actuated. To use standard parts, the rear levers 23a and 25a may be similarly formed.

Since bottle A is lowermost in the columns, it is the first to be dispensed. To dispense bottle A, the lever 23 is rotated in counterclockwise direction about the pivots 24 and 24a with a continuous and steady motion, thereby moving the support member 21 downwardly and to the right, in the direction indicated by the arrows 27a. During such movement, the lowermost bottle A is smoothly lowered, and together with it, both of the columns 17 and 18, until further downward movement is arrested by abutment of bottle B with the support member 22. Upon further counterclockwise movement of the support member 21, bottle A is fully released and permitted to drop out of the magazine, as illustrated in FIG. 3. It will be noted that the support rod 21 at the end of its travel is disposed beneath the support member 22, thereby providing full freedom for bottle A to drop. After the dispensing operation, the lever 23 is rotated in clockwise direction until the support rod 21 is returned to its original or rest position, as shown in FIG. 1.

During the next dispensing operation, the support rod 22 is actuated in substantially the same manner, but the direction of movement is reversed; that is, the support rod 22 is rotated about its pivots 26 and 26a in clockwise direction to release bottle B, thereby permitting downward movement of the two columns until further motion is arrested by abutment of bottle C with the support member 21. Subsequent to dispensing of bottle B, the support rod 22 is returned to its "at rest" position by rotation in counterclockwise direction about its pivots 26 and 26a.

The lower arm of the lever 23 is formed with a cutaway portion or notch to receive or accommodate the support rod 22 when the lever 23 has moved to its farthest position in counterclockwise direction as shown in FIG. 3. Thus, the desired extent of movement is permitted. The rear lever 25a is formed with a similar notch 27 to accommodate the support rod 21 as the lever 25 is moved in clockwise direction during the dispensing operation. The use of standard parts results in the remaining levers 25 and 23a having such notches. It may be noted here that the levers 25 and 25a for the support rod 22 are disposed forwardly of the levers 23 and 23a, so that the rods 21 and 22 may be of the same length, but with the rod 22 disposed slightly toward the front.

The support rods 21 and 22 may be actuated by any suitable mechanism, for example, by suitable cam structure comprising a pair of cam plates 28 and 29, shown in FIGS. 4 to 7. Accordingly, the levers 23 and 25 are provided adjacent their upper ends with cam rollers or followers 31 and 32, respectively.

Since the cam plates 28 and 29 are mirror images of each other, only the cam plate 28 will be described. The cam plate 28 is of vertically elongated rectangular form having a slot or cutaway portion 33 formed therein and receiving the associated cam follower 31. The slot 33 is provided with a vertically extending portion 34, an inclined portion 35 and a downwardly extending portion 36. Hence, as the cam plate 28 is moved upwardly, the lever 23 is rotated as dictated by the position of its follower 31 in the slot 33. In FIG. 4 the cam plate 29 is in its lowermost position with the roller 32 disposed in the vertical slot portion 34. With the cam plate 29 in this position, the support rod 22 is disposed in its rest position. The cam plate 28, on the other hand, is disposed in its extreme uppermost position with the cam follower 31 disposed in the downwardly extending slot portion 36. With the cam plate 28 in this position, the support rod 21 is disposed in the dispensing position.

As mentioned in connection with FIGS. 1 to 3, after the lowermost bottle A is released by the support rod 21, the rod 21 is returned to its normal or "at rest" position (FIG. 1) by downward movement of the associated cam plate 28. In this connection, it will be noted that the slot portions 36 and 34 are disposed in horizontally spaced relation with each other, while the central portion 35 provides the cam "throw" and also serves to connect the slot portions 36 and 34. Accordingly, the slot portions 36 and 34 may be considered to be "dwell" portions, since during movement of the roller in these portions, the associated lever is not rotated. However, as the roller is moved along the central portion 35, the associated lever is rotated. With the articles disposed in the magazine as illustrated in FIG. 4, the weight of the articles exerts a force on the support member 22 tending to rotate its associated lever 25 in clockwise direction. However, this force is resisted by the vertical edge of the slot portion 34 in the cam plate 29, so that, when a cam plate is in its lower position, a positive lock is maintained between the cam plate and the associated support member against accidental movement due to the weight of the articles or unauthorized manipulation of the support members from beneath the magazine for theft purposes.

The front wall member 14 is of U-shaped cross-section and is provided with upper and lower horizontally extending wall portions 37 and 38, respectively. The cam plates 28 and 29 are slidably received in suitable elongated apertures 39 and 40 provided in the upper and lower wall portions 37 and 38. The cam plates 28 and 29 may be further guided for vertical movement relative to the front wall member 14 by a pair of suitable rollers 41 (FIG. 7) attached to the latter.

The cam plates 28 and 29 are actuated by any suitable mechanism that is adapted to raise and lower the cam plates alternately in order to dispense articles or bottles from the columns alternately. For example, the novel mechanism shown on the drawing is well suited for this purpose. This mechanism comprises a horizontal U-shaped or channel member 42 vertically movable between the wall portions 37 and 38 and comprising upper and lower horizontal planar portions 43 connected to a vertical planar portion 44. The member 42 is supported by vertically extending guide strips 45 and 46 connected thereto and vertically slidable in slots 47 and 48 formed in the upper and lower wall portions 37 and 38, respectively, to provide for vertical reciprocating movement as indicated by the double-headed arrows 49 in FIGS. 2 and 7.

Within the channel member 42, lifters 51 and 52 are pivotally mounted on a shaft 53 carried by the member 42 and loosely hang from the shaft by gravitational effect. Each of the lifters 51 and 52 is provided with a rearwardly extending finger or detent 54 which is adapted to extend through an opening in the channel member 42 and which is also adapted to extend through an opening 55 in its associated cam plate 28 or 29 when the finger is moved rearwardly from its free-hanging position. Each of the lifters 51 and 52 is provided with a raised or lobe portion 56. A cam 57, mounted on a shaft 58, is adapted to contact the lobe portion 56 of the lifter 51 to project its finger 54 into the opening 55 of the cam plate for raising the latter to actuate the support rod 21, and a cam 59 also mounted on the shaft 58 is adapted to contact the lobe portion of the lifter 52 to project its finger 54 into the opening 55 of the cam plate 29 for actuating the support member 22. Before each dispensing operation, the shaft 58 is rotated the proper angular distance by a solenoid 61 through a suitable ratchet and pawl mechanism 62, so that the lifters 51 and 52 are alternately operated from their disengaged position in order to alternately operate the support members 21 and 22. The solenoid 61 is mounted on the upper planar portion 43 by means of a bracket 60.

The ratchet and pawl mechanism 62 comprises a ratchet wheel 63 mounted rigidly on the cam shaft 58, and having planar ratchet teeth 64 in its periphery and having a bent ratchet tooth 65 extending at right angles to the plane of the ratchet wheel along one side of every other ratchet tooth 64, as shown in FIG. 8.

The ratchet and pawl mechanism 62 further comprises a bell crank lever 66 mounted on the shaft 58 but freely rotatable thereon. One arm of the bell crank lever 66 is connected to the solenoid 61 by a link 67 pivoted to the solenoid and to the arm of the bell crank lever, and the other arm of the bell crank lever carries a pawl 68 pivoted thereto and adapted to engage the ratchet teeth 64. The mechanism 62 further includes a member 69 spring-biased to the position shown in FIG. 5 in the path of the bent ratchet teeth 65.

It is to be understood that any suitable actuating mechanism (not shown) may be provided to operate the dispensing mechanism through a rock shaft 70 and two levers 71 fixed to the shaft 70 and having suitable connections with the vertical guide strips 45 and 46.

*Operation*

Assume that the lowermost bottle is in the left-hand column 17 resting on the support member 21 as shown in FIG. 1. To effect a dispensing operation, the solenoid 61 is energized and by means of pawl 68 and ratchet wheel 63 moves the cam shaft 58 and the cam 57 into the position shown in FIGS. 6 and 9 to engage the cam plate 28. Then, the actuating mechanism is operated and it raises the channel member 42, which, by reason of the engagement of the finger 54 of the lifter 51 with the edge of the opening 55 in the cam plate 28, raises the cam plate 28. The lifter 52 is retained by gravity in a position in which its finger 54 is withdrawn from the opening in the cam plate 29, which therefore remains in its lowermost position. As the cam plate 28 moves upwardly the inclined portion 35 of the slot 33 moves the lever 23 in counterclockwise direction, causing the support member 21 to swing downwardly and to the right under the support member 22, thereby lowering the bottle A and allowing the remaining bottles to descend until bottle B rests on support member 22 as shown in FIG. 2. Continued movement of the support member 21 enables the bottle A to be completely released, as shown in FIG. 3, after which the actuating mechanism lowers the channel member 42 and with it the cam plate 28. The inclined portion of the slot in the cam plate 28 now moves the support member 21 in clockwise direction to return it to its normal or "at rest" position shown in FIG. 1, where it is firmly retained by reason of the vertical slot portion 34. Toward the end of the downward movement of channel member 42, member 69 engages a bent ratchet tooth 65 to rotate the ratchet assembly 62, moving the cam shaft 58 and cam 57 into a neutral position, as shown in FIG. 8, where neither cam 57 nor cam 59 is in engagement with the lobe of its associated lifter.

Upon the next dispensing operation, the solenoid 61 is again energized and moves the cam shaft to bring a lobe of the cam 59 into contact with the lobe portion of the lifter 52, to move its finger 54 into the opening 55 of the cam plate 29. Thus, upon upward movement of the channel member 42, the cam plate 29 is raised by reason of the engagement of the finger 54 of the lifter 52 with the edge of the opening in the cam plate 29, while the cam plate 28 remains in its lowermost position. Upward movement of the cam plate 29 causes clockwise movement of the support member 22 about its pivots 26 and 26a, permitting the lowermost bottle B in the right-hand column 18 to be released after the remaining bottles have descended until bottle C is engaged by support member 21.

During this movement, the support member 22 moves downwardly and to the left under the support member 21. The channel member 42 then moves the cam plate 29 downwardly, whereupon the lever 25 is moved in counterclockwise direction to return to its normal or "at rest" position.

A characteristic of the ratchet and pawl mechanism 62 is that it provides a disengaged or neutral position of the lifters 51 and 52 when member 42 moves downwardly at the end of the dispensing operation. Referring to FIGS. 5, 6 and 8, FIG. 8 shows the ratchet wheel 63 at its position prior to dispensing. At the start of a dispensing operation, solenoid 61 moves pawl 68 to advance the ratchet wheel 63 by forty-five degrees clockwise, or in other words, one tooth. The bent ratchet teeth 65 are now in the positions intermediate those shown in FIG. 8 and one of the cams 57 and 59 engages the lobe portion of its lifter. Member 42 rises to lift the plate 28 or 29. On the up stroke, bent ratchet tooth 65 forces member 69 away and moves on upwardly, and member 69 returns to vertical position under the tooth 65. On the down stroke at completion of the dispensing operation, member 69 engages the lower or horizontal edge of bent ratchet tooth 65 and rotates the ratchet assembly forty-five degrees clockwise to disengage the same from the lobe portion of its lifter. The assembly is again in a rest position in which both lifters 51 and 52 are in their disengaged or neutral position, the assembly having been rotated ninety degrees from the previous rest position.

It will be apparent from the above description that various numbers of columns may be controlled by one ratchet assembly by varying the number of actuating surfaces per cam, the number of teeth on the ratchet wheel and the angular travel per solenoid stroke. It is also to be noted that, since the assembly is disengaged from all lifters at the end of a dispensing operation and does not engage unless the solenoid is energized, that several ratchet assemblies may be mounted on a single channel member 42. With this arrangement, an article may be dispensed from a magazine served by one ratchet assembly without disturbing another ratchet assembly, so that upon a subsequent operation of one of the other ratchet assemblies it will continue at the proper point in its sequence of operation of the several cam plates served thereby.

Also, on the down stroke of channel member 42, its lower planar portion 43 pushes against the top surface of angle bracket 72 attached to cam plate 28 or 29 to provide positive downward drive of the cam plate.

While the invention has been shown in but one form, it will be obvious to those skilled in the art that it is not so limited, but is susceptible of various changes and modifications without departing from the spirit thereof.

What is claimed is:

1. Article dispensing apparatus comprising
    a magazine having a pair of spaced vertically extending side walls,
    first and second support members in said magazine disposed, when in their rest positions, on opposite sides of a central plane midway between said side walls, means for mounting each of said support members for pivotal movement about an axis disposed above the support member and on the opposite side of said central plane, and actuating means for effecting pivotal movement of each support member, from its position of rest downwardly and transversely of said central plane to a position beneath the other support member and then back to its rest position while the other support member remains in its rest position.

2. Article dispensing apparatus comprising a magazine adapted to contain articles in two columns with the articles of one column in vertically staggered and overlapping relation to the articles of the other column, first and second support members disposed beneath said columns respectively, each support member being mounted for movement between a position of rest in which it is adapted to support an article resting thereon and a releasing position in which it permits said article to be released, each support member having means, including a reciprocable member, operable upon movement of the reciprocable member in one direction to move the support member from its rest position to its releasing position and upon movement of the reciprocable member in the opposite direction to move the support member from its releasing position to its rest position while the other support member is maintained in its rest position by its reciprocable member, a common operating mechanism operable, in one dispensing operation, to move one reciprocable member first in said one direction and then in said opposite direction, and means for alternately coupling one and then the other of said reciprocable members to said common operating mechanism, whereby articles are dispensed alternately from one and then the other of said columns and both of said support members are always returned to their rest positions at the end of each dispensing operation.

3. Article dispensing apparatus comprising a magazine adapted to contain articles in two columns with the articles of one column in vertically staggered and overlapping relation to the articles of the other column, the two columns being disposed adjacent two sides of the magazine, respectively, first and second support rods disposed beneath said columns, respectively, each support rod being mounted for pivotal movement between a position of rest in which it is adapted to support an article resting thereon and a releasing position in which it permits said article to be released, said rods and the axes of pivotal movement thereof extending parallel to each other and to said sides, each support rod having an operating arm and a cam follower on the arm, a vertically slidable cam plate for each support rod having a cam slot therein through which the associated cam follower extends, a common operating mechanism operable in one dispensing operation, to move one cam plate first upwardly and then downwardly and, means associated with each cam plate for coupling the same to said common operating mechanism, whereby each support rod is moved from its rest position to its releasing position and back to its rest position in one dispensing operation while the other support rod remains in its rest or support position.

4. Article dispensing apparatus comprising a magazine structure adapted to contain a plurality of columns of articles, article releasing elements associated with said magazine structure and individually movable from a non-dispensing position to a dispensing position, and actuating mechanism for effecting movement of said releasing elements from said non-dispensing position to said dispensing position in a sequential manner, said actuating mechanism including, a member cooperatively associated with each releasing element and movable in one direction to position the associated releasing element in said dispensing position and in the opposite direction to position the releasing element in said non-dispensing position, a carriage structure, means for translating said carriage structure first in said one direction and then in said opposite direction, an engaging element associated with each member and carried by said carriage structure, means including a plurality of cams for moving said engaging elements into and out of engagement with their associated members to connect said members to said carriage structure and to disconnect said members from said carriage structure, respectively, and means for rotating said cams in angular increments, said cams being arranged in a manner to move one of their associated engaging elements into and out of said engagement during two successive angular increments.

References Cited by the Examiner

UNITED STATES PATENTS

| | | | |
|---|---|---|---|
| 1,434,057 | 10/22 | Horwitt | 221—67 |
| 1,940,603 | 12/33 | Nicholson | 221—126 |
| 2,615,773 | 10/52 | Holt et al. | 221—67 |
| 2,825,488 | 3/58 | Nelson | 221—67 |
| 2,835,409 | 5/58 | Rankin | 221—67 |
| 2,878,961 | 3/59 | Voorhees et al. | 221—67 X |
| 3,146,907 | 9/64 | Bookout | 221—67 |

FOREIGN PATENTS

| | | |
|---|---|---|
| 1,225,207 | 2/60 | France. |
| 844,600 | 8/60 | Great Britain. |

LOUIS J. DEMBO, *Primary Examiner.*

KENNETH N. LEIMER, RAPHAEL M. LUPO,
*Examiners.*